(12) United States Patent
Takenaka et al.

(10) Patent No.: US 6,807,450 B1
(45) Date of Patent: Oct. 19, 2004

(54) METHOD OF AND APPARATUS FOR REPRODUCING A PLURALITY OF INFORMATION PIECES

(75) Inventors: Yoshihiko Takenaka, Tokorozawa (JP); Yasumitsu Hitomi, Tokorozawa (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/225,354

(22) Filed: Jan. 5, 1999

(30) Foreign Application Priority Data

Jan. 6, 1998 (JP) .......................................... 10-012109

(51) Int. Cl.$^7$ .......................... G06F 17/00; G11B 5/09
(52) U.S. Cl. ..................... 700/94; 369/47.13; 84/609
(58) Field of Search ........................ 700/94; 381/119, 381/106; 369/47.17, 53.33, 47.13, 84, 4; 386/96–106; 84/601, 602, 609

(56) References Cited

U.S. PATENT DOCUMENTS

| 3,723,667 | A |   | 3/1973  | Park, Jr et al. |         |
|-----------|---|---|---------|------------------|---------|
| 5,377,167 | A |   | 12/1994 | Maeda et al.     |         |
| 5,563,866 | A | * | 10/1996 | Taguchi et al.   | 369/83  |
| 5,587,978 | A |   | 12/1996 | Endo et al.      |         |
| 5,619,483 | A |   | 4/1997  | Yokota et al.    |         |
| 5,625,461 | A |   | 4/1997  | Okamoto et al.   |         |
| 5,625,611 | A |   | 4/1997  | Yokota et al.    |         |
| 5,668,789 | A |   | 9/1997  | Yokota et al.    |         |
| 5,719,837 | A | * | 2/1998  | Aramaki          | 369/47.13 |
| 5,886,967 | A | * | 3/1999  | Aramaki          | 369/47.13 |
| 5,895,121 | A | * | 4/1999  | Grey et al.      | 386/52  |
| 5,995,470 | A | * | 11/1999 | Tsubaki et al.   | 369/83  |
| 6,088,304 | A | * | 7/2000  | Aramaki          | 369/32  |
| 6,473,375 | B1| * | 10/2002 | Aramaki          | 369/47.13 |

FOREIGN PATENT DOCUMENTS

EP          0 789 360 A2      8/1997

* cited by examiner

Primary Examiner—Xu Mei
(74) Attorney, Agent, or Firm—Nixon & Vanderhye, PC

(57) ABSTRACT

An information reproducing apparatus reproduces a plurality of information pieces recorded on a recording medium. The apparatus has: a reading device for reading the information pieces from the recording medium in accordance with a predetermined reproduction order; a linking device for linking the information pieces read by the reading device with each other, by removing either or both of a beginning and an ending of each of the information pieces; and a converting device for converting the information pieces linked by the linking device into a reproduction signal to be supplied to an output device.

19 Claims, 6 Drawing Sheets

METHOD OF AND APPARATUS FOR REPRODUCING A PLURALITY OF INFORMATION PIECES

BACKGROUND OF THE INVENTION

1. Field of the Invention

The present invention relates to an information reproducing method and an information reproducing apparatus for reading information pieces recorded on a record medium, such as an MD (Mini Disc) or the like and then demodulating it.

2. Description of the Related Art

An MD player is an information reproducing apparatus for reading compressed information recorded on an MD and then demodulating it. The MD is one type of record medium. Compressed information, for example, compressed digital audio data is spirally recorded on the MD. The compressed information is divided into a plurality of compressed information pieces. In other words, the compressed information is recorded at a unit of information piece. Hereafter, this information piece is referred to as "compressed information piece". For example, if the compressed information is music, one compressed information piece is a song. Moreover, control information indicative of a record position (for example, an address) of the compressed information piece together with the compressed information is recorded on the MD.

The MD player is provided with: a spindle motor for rotating the MD; a pickup for optically reading the compressed information recorded on the MD; a servo controller for controlling a movement of the pickup on the MD; a signal processor for demodulating the compressed information read by the pickup; a key input section for receiving a command from a user; and a system controller for controlling the MD player as a whole.

The MD player is operated as follows. When a user uses the key input section to then enter a command of reproducing the MD in the MD player, the pickup radiates a laser light toward the rotating MD. Then, the pickup receives the laser light reflected by the MD, and then converts the laser light into an electrical signal. This electrical signal contains the compressed information recorded on the MD. The signal processor receives the electrical signal outputted by the pickup, and then demodulates it. Accordingly, the compressed information is reproduced.

In order to read out the compressed information recorded on the MD by using the pickup, it is necessary to accurately control a radiation position (namely, a read position) of the laser light radiated by the pickup. This is achieved by the servo controller. The electrical signal outputted by the pickup contains the information with regard to the read position of the pickup. The servo controller controls the read position of the pickup based on this information The MD player not only can simply reproduce the plurality of compressed information pieces recorded on the MD, but also can change a reproduction order of the compressed information pieces based on a user indication. For example, if the MD on which a plurality of songs are recorded is reproduced by the MD player, the user can select several songs from the plurality of songs to then set the reproduction order of the songs. When the reproduction order of the songs is inputted, the MD player reproduces the songs in the inputted reproduction order.

If such an MD player is mounted in a car, a driver can hear the MD in the running car. However, in this case, problems described below are brought about.

In general, if a plurality of songs are recorded on the MD, a silent portion (a blank portion) exists between the songs. That is, in order to clarify a pause between the songs, each song is recorded so as to be kept silent for a few seconds at the beginning of each song. In case of a song whose ending is fade-out, a level of a musical sound becomes gradually lower at the ending of the song.

In this case, at the ending of the song, the musical sound is erased by a noise within the running car. As a result, the driver can not hear the ending of the song, and thereby feels that a period from the end of the song to the start of the next song is long. In other words, the user feels that the blank between the compressed information pieces is long.

In a case of a song whose beginning is fade-in, the level of the musical sound is low at the beginning of the song. Also in this case, the driver can not hear the beginning of the song, and thereby feels that the period between the songs is long. In other words, the user feels that the blank between the compressed information pieces is long.

Such a problem is not limited to the case in which the MD is reproduced within the running car. The problem may be brought about even in a case that the MD is reproduced in a room where the noise is relatively large, an outdoor and the like.

SUMMARY OF THE INVENTION

The present invention is proposed in view of the above-mentioned problems. It is therefore a first object of the present invention to provide an information reproducing method and an information reproducing apparatus which can prevent a user from feeling that a blank at a boundary between continuously reproduced information pieces is long when information composed of a plurality of information pieces is continuously reproduced from a record medium.

A second object of the present invention is to provide an information reproducing method and an information reproducing apparatus which can prevent a user from feeling that a connection between continuously reproduced information pieces is unnatural when information composed of a plurality of information pieces is continuously reproduced.

The aforementioned first object can be achieved by an information reproducing apparatus in accordance with the present invention. The information reproducing apparatus is an apparatus for reproducing a plurality of information pieces recorded on a recording medium. The apparatus has: a reading device for reading the information pieces from the recording medium in accordance with a predetermined reproduction order; a linking device for linking the information pieces read by the reading device with each other, by removing either or both of a beginning and an ending of each of the information pieces; and a converting device for converting the information pieces linked by the linking device into a reproduction signal to be supplied to an output device.

Information is recorded on the recording medium. The information is divided into the information pieces on the recording medium. The information pieces are read from the recording medium by the reading device. Then, either or both of the beginning and the ending of these information pieces are removed, and then, they are linked with each other. Therefore, information for the purpose of identifying the boundary between the information pieces, such as a blank part, a fade-out part, a fade-in part, etc., as mentioned above, can be removed, and the information pieces can be linked in such a way that they are continuously reproduced without a pause.

The linking device may include: a read position detecting device for detecting a read position of the reading device on the recording medium; and a read position control device for controlling a movement of the read position of the reading device on the recording medium. The read position detecting device detects a first read position corresponding to a first position of each of the information pieces, which is located in the vicinity of the ending of each of the information pieces. Then, the read position control device controls the movement of the read position such that the read position jumps from the first read position to a second read position corresponding to a second position of each of the information pieces, which is located in the vicinity of the beginning of each of the information pieces.

Furthermore, the linking device may include a storing device for storing the information pieces read by the reading device such that the first position of each of the information pieces is linked with the second position of each of the information pieces in accordance with the reproduction order. For example, a first information piece is firstly read by the reading device, and stored in the storing device. At this stage, the first information piece except for the area located between the first position of this information piece and the edge of the ending of this information piece is stored in the storing device. Next, a second information piece is read by the reading device, and stored in the storing device. At this time, the second information piece except for the area located between the edge of the beginning of this information piece and the second position of this information piece is stored in the storing device. Since the second information piece and the second information piece are continuously stored in the storing device, the first position of the first information piece and the second position of the second information piece are linked with each other.

The first position may be located within the information piece and located a predetermined distance away from the edge of the ending of this information piece. As a result, the area between the first position and the edge of the ending of the information piece is removed by the linking device. If the blank part or the fade-out part is included in this area, the blank part or the fade-out part is removed from the information piece.

Alternatively, the first position may be located at the edge of the ending of each of the information pieces. As a result, no area located in the ending of the information pieces is removed. In addition, in this case, it is necessary to remove the area located in the beginning of the information piece.

The second position may be located within the information piece and located a predetermined distance away from the edge of the beginning of this information piece. As a result, the area between the edge of the beginning of the information piece and the second position is removed by the linking device. If the blank part or the fade-in part is included in this area, the blank part or the fade-is part is removed from the information piece.

Alternatively, the second position may be located at the edge of the beginning of each of the information pieces. As a result, no area located in the beginning of the information pieces is removed. In addition, in this case, it is necessary to remove the area located in the ending of the information piece.

The aforementioned second object can be achieved by the information reproducing apparatus with a volume control device in accordance with the present invention. If each of the information pieces includes audio information and the reproduction signal is an audio signal, the information reproducing apparatus may include a volume control device for controlling a volume of the audio signal corresponding to the audio information included in each of the information pieces. Further, in this case, the volume control device may control the volume such that the volume gradually decreases from a third position of the information piece, which is located a predetermined distance away from the first position of this information piece, to the first position of this information piece. Furthermore, the volume control device may control the volume such that the volume gradually increases from the second position of the information piece to a fourth position of this information piece, which is located a predetermined distance away from the second position of this information piece.

The volume control device serves to compensate unnaturalness caused by linkage of the information pieces by the linking device, if the linkage is unnatural. For example, the volume control device performs the volume control on the first information piece such that the volume of the audio signal corresponding to the area between the third position and the first position gradually decreases. This area is located at the ending of each information piece included in the linked information pieces. At this time, the amount of the decrease of the volume is decided for the purpose of the compensation of unnaturalness caused by the linkage of the information pieces. Furthermore, the volume control device performs the volume control on the second information piece such that the volume of the audio signal corresponding to the area between the second position and the fourth position gradually increases. This area is located at the beginning of each information piece included in the linked information pieces. At this time, the amount of the increase of the volume is decided for the purpose of the compensation of unnaturalness caused by the linkage of the information pieces.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanied drawings, embodiments of the present invention will be described. In the description set forth hereinafter, the present invention is applied to an MD player.

First Embodiment

Figure 1:
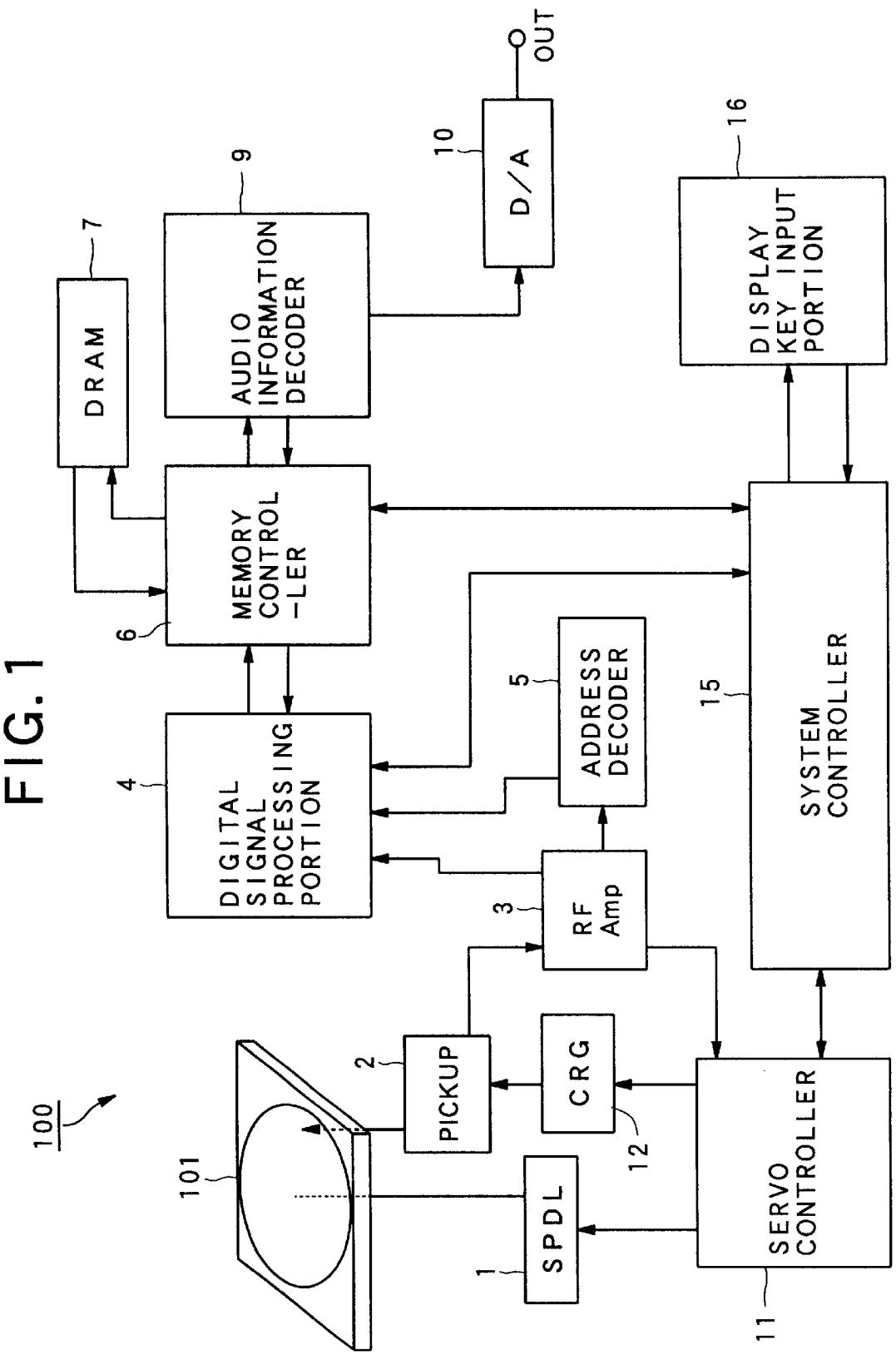
FIG. 1 is a block diagram showing an MD player according to a first embodiment of the present invention.

As shown in FIG. 1, an MD player 100 is an information reproducing apparatus for reading compressed information recorded on an MD 101 and then demodulating it. The MD 101 is one type of information record medium. Compression information, for example, compressed digital audio data is recorded on the MD 101. The compressed information is divided into a plurality of compressed information pieces. In other words, the compressed information is recorded at a unit of compressed information piece. For example, if the compressed information is a music, one compressed information piece is a song. Moreover, control information indicative of a record position (for example, an address) of the compressed information piece together with the compressed information is recorded on the MD 101. Moreover, there is an information area on an inner circumference of the MD 101. The inherent data (for example, TOC information) with regard to each compressed information piece, such as a start address, an end address, a number of the compressed information piece and the like, in each compressed information piece is recorded on this information area in accordance with a predetermined recording format.

The MD player 100 is provided with a spindle motor (SPDL) 1, a pickup 2, an RF amplifier 3, a digital signal processing portion 4, an address decoder 5, a memory controller 6, a DRAM (Dynamic Random Access Memory) 7, a system controller 15, an audio information decoder 9, a D/A (digital to analog) converter 10, a servo controller 11, a pickup carriage (CRG) 12 and a display key input portion 16.

The MD player 100 is operated as follows. When a user loads the MD 101 into the MD player 100, and then uses the display key input portion 16, and further enters a command into the MD player 100, the pickup 2 radiates a laser light toward the MD 101. The system controller 15 controls the servo controller 11 such that the laser light is focused on the MD 101. The system controller 15 drives the spindle motor 1 to then rotate the MD 101 at a predetermined speed. Then, the system controller 15 drives the pickup carriage 12, and then moves the pickup 2 in order to read the information recorded on the MD 101 in accordance with an inputted operation command.

The pickup 2 radiates the laser light to an information record surface of the MD 101, and then receives the laser light reflected on the MD 101. The pickup 2 converts the received laser light into an electrical signal. This electrical signal is sent to the RF amplifier 3 as an RF (Radio Frequency) signal. The RF amplifier 3 sends this RF signal to the digital signal processing portion 4 and the address decoder 5. Then, the RF amplifier 3 generates an error signal on the basis of this RF signal, and then sends this error signal to the servo controller 11. Accordingly, a read error of the pickup 2 is corrected.

The address decoder 5 demodulates address data indicative of a present read position of the pickup 2 on the basis of the RF signal, and then sends this address data to the digital signal processing portion 4. The digital signal processing portion 4 amplifies the RF signal sent by the RF amplifier 3, and then converts this RF signal into a binary value by using a predetermined slice level. Then, the digital signal processing portion 4 performs an EFM demodulation and an error correction process on the binary RF signal. Accordingly, the compressed information is restored. Then, this compressed information together with the address data is sent from the digital signal processing portion 4 to the memory controller 6.

The memory controller 6 transfers the compressed information to the DRAM 7 under the control of the system controller 15. The transfer order of the compressed information is determined in accordance with the address data. Under the control of the system controller 15, the DRAM 7 stores the transferred compressed information and further transfers the stored compressed information to the audio information decoder 9 in the recorded order.

The transfer speed of the compressed information transferred to the DRAM 7 from the memory controller 6 is faster than that of the compressed information transferred to the audio information decoder 9 from the DRAM 7. Accordingly, the compressed information transferred from the memory controller 6 is stored in the DRAM 7 until the amount of the compressed information stored in the DRAM 7 reaches the upper limit of the capacity of the DRAM 7. In this way, the DRAM 7 functions as a buffer memory for temporarily storing the data read by the pickup 2.

The audio information decoder 9 expands the compressed information transferred by the DRAM 7, and then prepares digital audio data, and further sends it to the D/A converter 10. The D/A converter 10 converts this digital audio data into an analog audio signal, and then outputs it from an output terminal. This analog audio signal is sent through an amplifier (not shown) to a speaker and the like (not shown).

While the pickup 2 reads the information recorded on the MD 101, the servo controller 11 carries out a focus control and a tracking control with regard to the pickup 2, on the basis of the error signal sent by the RF amplifier 3, and further controls the rotation of the spindle motor 1. Accordingly, the pickup 2 is controlled so as to accurately read the information recorded on the MD 101.

Moreover, the MD player 100, before reading the compressed information recorded on the MD 101, reads the inherent data with regard to the compressed information piece (this data includes the start address of the compressed information), from the information area located on the inner circumference side of the MD 101. Then, they are stored in an internal memory within the system controller 15.

Accordingly, when the compressed information is reproduced, it is possible to easily access the start position of the compressed information piece. More specifically, when a user uses the display key input portion 16 to then specify a reproduction of a desirable compressed information piece, the system controller 15 detects address data corresponding to a present read position of the pickup 2 on the basis of the RF signal. Then, the system controller 15 reads out the start address of the specified compressed information piece from the internal memory. Then, the system controller 15 compares the read out start address with the address data corresponding to the present read position of the pickup 2. Next, the system controller 15 controls the servo controller 11 based on the comparison result, and then moves (jumps) the pickup 2. Accordingly, the read position of the pickup 2 can be moved to the start address of the specified compressed information piece to thereby read this compressed information piece.

Moreover, the MD player 100 can select any one or more compressed information pieces from a plurality of compressed information pieces recorded on the MD 101 and then set the reproduction order of the selected compressed information pieces. More specifically, when the user uses display key input portion 16 and then selects a plurality of compressed information pieces and further sets the reproduction order of the selected compressed information pieces, the numbers of the compressed information pieces arrayed on the basis of the reproduction order are stored in the internal memory within the system controller 15. The system controller 15 controls the servo controller 11, and then jumps the pickup 2 in accordance with the number of the compressed information piece stored in the internal memory. Actually, the system controller 15, immediately after reading a compressed information piece, jumps the pickup 2 toward a start address of a next compressed information piece in accordance with the number of the compressed information piece. The repetition of such a reading and jumping operation enables the compressed information piece to be reproduced in the reproduction order set by the user.

While the pickup 2 jumps over the information record surface of the MD 101, the information reading operation of the pickup 2 is temporarily suspended. Meanwhile, the system controller 15 controls the memory controller 6 so as to suspend the transfer of the compressed information to the DRAM 7 from the memory controller 6. Moreover, when the jump of the pickup 2 is ended and then the information reading operation of the pickup 2 is resumed, the system controller 15 controls the memory controller 6 so as to resume the transfer of the compressed information to the DRAM 7 from the memory controller 6. Accordingly, the compressed information read immediately after the information reading operation of the pickup 2 is resumed is stored immediately after the compressed information read immediately before the information reading operation of the pickup 2 is suspended. Thus, the compressed information read before the jump and the compressed information read after the jump are continuously stored in the DRAM 7. As a result, if a period while the pickup 2 jumps is shorter than a period until all the compressed information stored in the DRAM 7 is transferred to the audio information decoder 9, the compressed information is continuously reproduced without a disconnection. In other words, the reproduction of the compressed information is never temporarily suspended because of the jump of the pickup 2.

The memory controller 6 always recognizes the address data sent by the digital signal processing portion 4 together with the compressed information, and then manages the transfer order of the compressed information in accordance with the address data. If the read position of the pickup 2 is out of the normal position because of addition of external shock or the like to the pickup 2 during reading the compressed information, the system controller 8 recognizes an address immediately before the read position of the pickup 2 is out of the normal position through the memory controller 6. Then, the system controller 8 controls the servo controller 11 so as to return the read position of the pickup 2 to the normal position, based on this address.

If the read position of the pickup 2 is out of the normal position, the system controller 8 controls the memory controller 6 so as to suspend the transfer of the compressed information to the DRAM 7 from the memory controller 6. Then, when the read position of the pickup 2 is returned to the normal position, the system controller 8 controls the memory controller 6 so as to resume the transfer of the compressed information to the DRAM 7 from the memory controller 6. Thus, the compressed information read before the read position becomes out of the normal position and the compressed information read after the read position is returned to the normal position are continuously stored in the DRAM 7. As a result, if the period while the read position of the pickup 2 is out of the normal position is shorter than the period until all the compressed information stored in the DRAM 7 is transferred to the audio information decoder 9, the compressed information is continuously reproduced without a disconnection.

The MD player 100 according to the embodiment of the present invention has a linking function, in addition to the basic reproducing function as mentioned above.

The linking function is a function that links a plurality of compressed information pieces by removing a silent portion (that is, a blank portion) between the compressed information pieces, the ending of the compressed information piece or the beginning of the compressed information piece, when continuously reproducing a plurality of compressed information pieces. For example, if the compressed information pieces are songs, the linking function is a function that links the plurality of songs by removing a silent portion between the songs, the ending of the song (a fade-out portion) and the beginning of the song (a fade-in portion).

The silent portion between the songs is recorded on the MD as the compressed information indicating the silence. This silent portion constitutes a part of the song, namely, the compressed information piece. For example, this silent portion is located at the beginning of the compressed information piece. Of course, each of the fade-out portion located at the ending of the song and the fade-in portion located at the beginning of the song also constitutes a part of the song, namely, the compressed information piece.

As mentioned above, the MD player 100 continuously reproduces the compressed information recorded on the MD 101. However, if there is the silent portion in the compressed information stored in the MD 101, the MD player 100 usually reproduces the silent portion similarly to the other portions. Of course, even if there is the fade-out portion or the fade-in portion in the compressed information stored in the MD 101, the MD player 100 usually reproduces the fadeout portion and the fade-in portion similarly to the other portions. Thus, if there is the silent portion, the fade-out portion or the fade-in portion in the compressed information stored in the MD 101, a reproduction sound may become actually intermittent, and a sound volume may become smaller.

In addition, the fade-in portion implies the portion at which the sound volume of the reproduction sound corresponding to the compressed information does not reach a predetermined level, at the beginning of the compressed information piece. The fade-out portion implies the portion at which the sound volume of the reproduction sound corresponding to the compressed information does not reach a predetermined level, at the ending of the compressed information piece.

On the contrary, when the linking function is executed, the MD player 100 reproduces the compressed information at a reproduction mode different from the above-mentioned usual reproduction mode. That is, the MD player 100, when reproducing the compressed information, removes the silent portion, the fade-out portion and the fade-in portion in the compressed information stored in the MD 101, in accordance with a predetermined condition as described later. As a result, a silent portion located at a boundary between the compressed information pieces and a portion in which the sound volume is small are removed, and thereby the reproduction sound becomes actually continuous throughout the plurality of compressed information pieces.

This point will be concretely explained. The display key input portion 16 has a mode selection key to execute the linking function. When a user uses this mode selection key to then specify the execution of the linking function, the linking function is executed in the MD player 100. When the linking function is executed, the memory controller 6 removes the compressed information located at the silent portion between the compressed information pieces, the ending of the compressed information piece and the beginning of the compressed information piece under the control of the system controller 15, when transferring to the DRAM 7 the compressed information supplied at the specified reproduction order. Thus, the compressed information stored in the DRAM 7 is continuously read out as mentioned above. Accordingly, the ending of the compressed information piece and the beginning of a next compressed information piece following it are linked and restored continuously and integrally.

Figure 2:
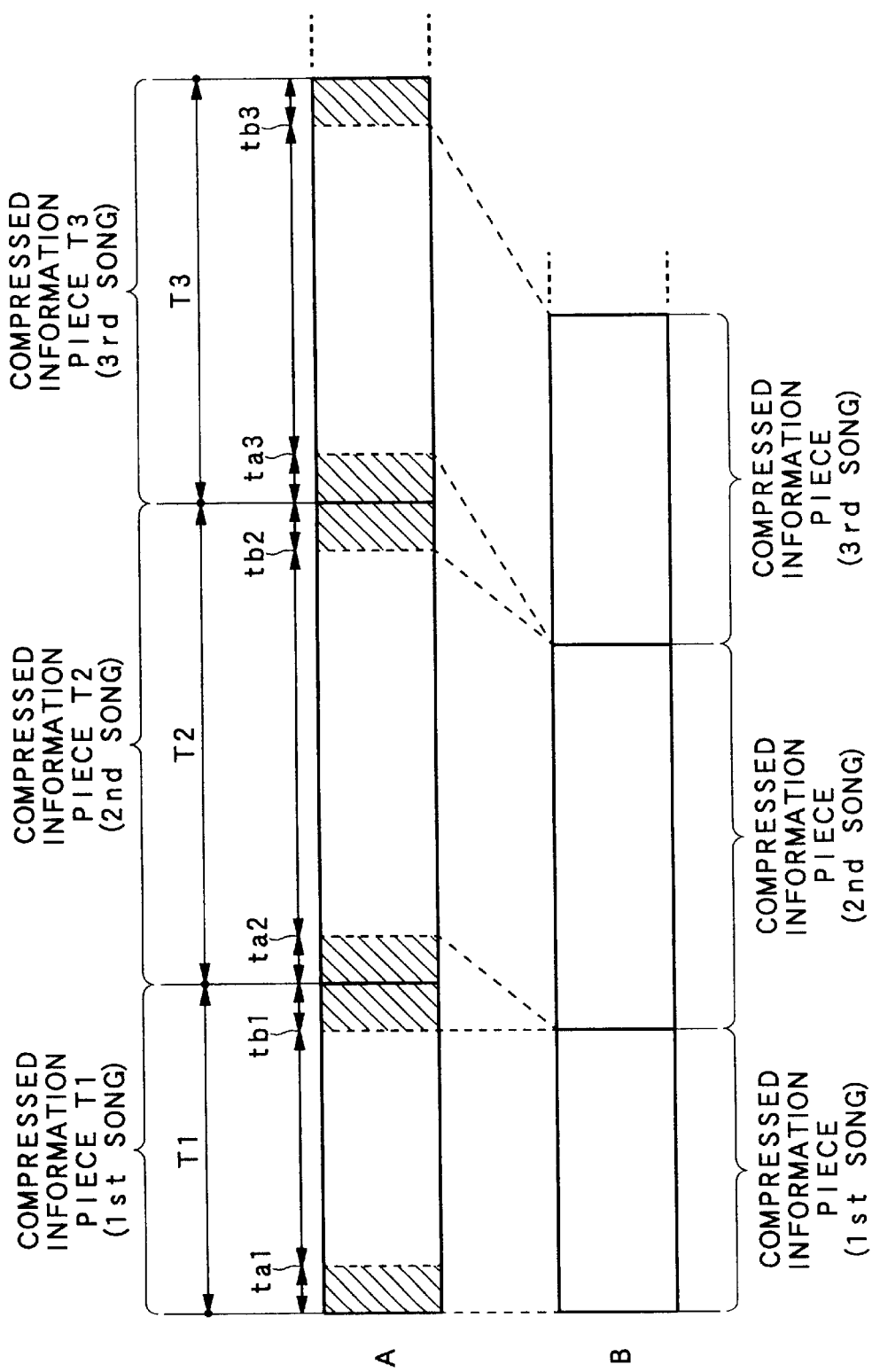
FIG. 2 is a diagram showing compressed information pieces.

FIG. 2 is a diagrammatic view showing a state that the compressed information recorded on the MD 101 for each compressed information piece is stored in the DRAM 7 by using the linking function. (A) in FIG. 2 shows the compressed information recorded on the MD 101. When the linking function is not executed, namely, at a time of the usual reproduction mode, the compressed information is stored in the DRAM 7 while maintaining this state. On the other hand, (B) in FIG. 2 shows a state that the compressed information shown at (A) is stored in the DRAM 7, during executing the linking function.

As seen from FIG. 2, when the compressed information is stored into the DRAM 7 under the control of the linking function, the compressed information located on and after tb1 within the first compressed information piece T1 and the compressed information located before ta2 within the second compressed information piece T2 are removed. As a result, the compressed information corresponding to the first compressed information piece T1 and the compressed information corresponding to the second compressed information piece T2 are linked with each other. Next, the compressed information located on and after tb2 within the second compressed information piece T2 and the compressed information located before ta3 within the third compressed information piece T3 are removed. As a result, the compressed information corresponding to the second compressed information piece T2 and the compressed information corresponding to the third compressed information piece T3 are linked with each other. The similar process is performed on the other compressed information pieces. In this manner, the predetermined portions located at the beginning and ending of each compressed information piece are removed, and the remaining parts of the compressed information are linked with each other and stored into the DRAM 7.

In FIG. 2, the respective positions ta2, ta3, . . . , taN are located behind the edge of the beginning of each compressed information piece in time and located in the vicinity of the beginning of each compressed information piece. The compressed information corresponding to the above-mentioned silent portion and fade-in portion are included from the edge of the beginning of each compressed information piece to the respective positions ta2, ta3, . . . , taN. The respective positions tb1, tb2, tb3, . . . , tbN are located before the edge of the ending of each compressed information piece in time and located in the vicinity of the ending of each compressed information piece. The compressed information corresponding to the above-mentioned fade-out portion and silent portion are included from the respective positions tb1, tb2, tb3, . . . , tbN to the edge of the ending of each compressed information.

Figure 3:
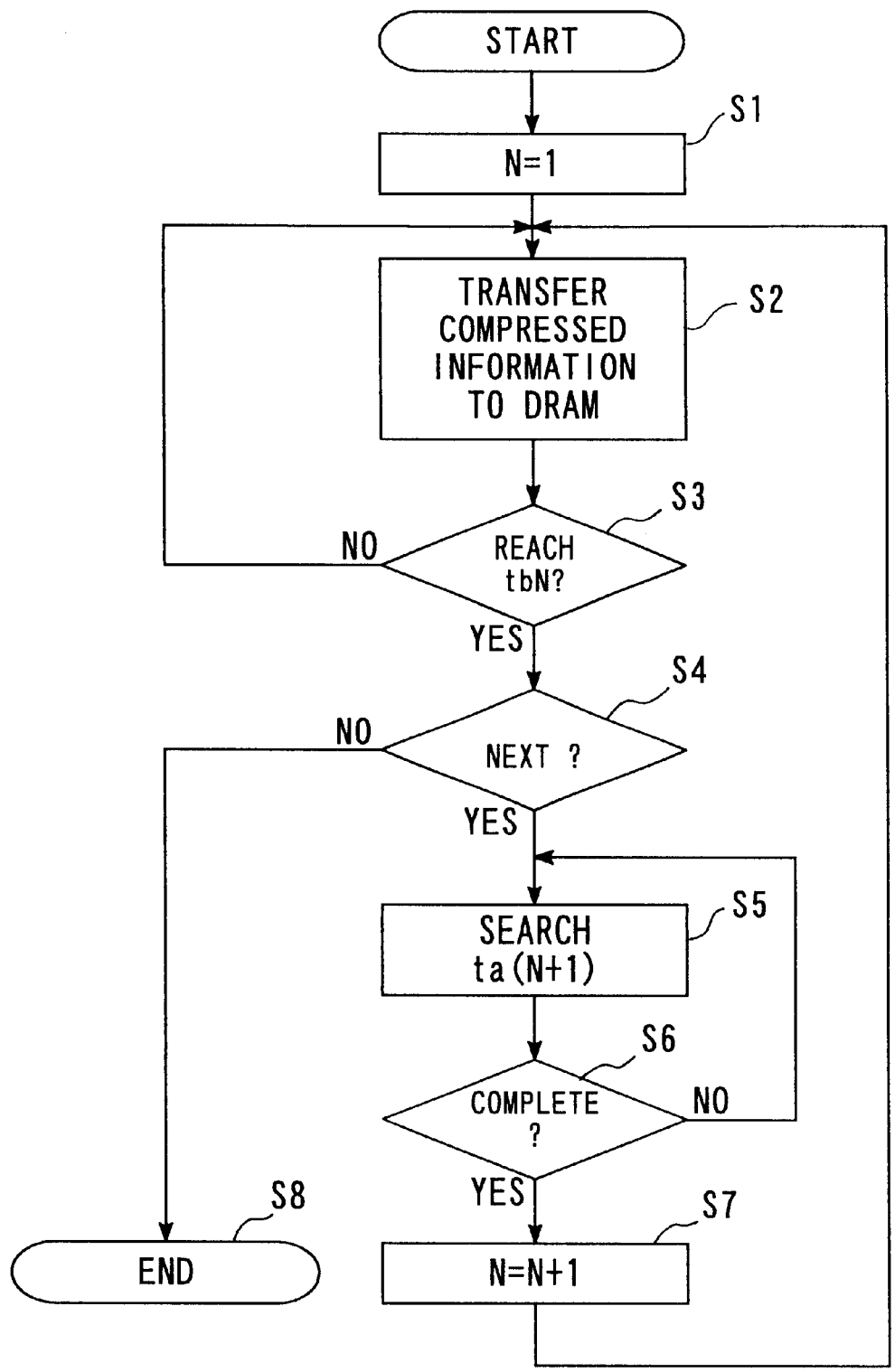
FIG. 3 is a diagram showing a transfer control process carried out by the MD player of the first embodiment of the present invention.

FIG. 3 shows the transfer control process of the compressed information to the DRAM 7 when this linking function is executed. This transfer control process is mainly executed by the system controller 15, as follows.

A user uses the display key input portion 16, and then selects several desirable compressed information pieces from a plurality of compressed information pieces recorded on the MD 101, and further sets a reproduction order of the selected compressed information pieces. This reproduction order is stored in the internal memory of the system controller 15. In addition, if the user does not set the reproduction order, the reproduction order is automatically set in accordance with reproduction order information (this is included in the TOC information) stored in the MD 101.

When the user specifies the linking function and then enters a command of starting the reproduction, the system controller 15 starts the transfer control process of the compressed information as described below.

At first, the system controller 15 assigns a value of 1 to a counter N to specify the number of the compressed information piece (step 1). Next, the system controller 15 reads the compressed information corresponding to the first compressed information piece T1 from the MD 101, and then transfers it to the DRAM 7 (step 2).

Actually, the system controller 15 controls the servo controller 11, and then moves a read position of the pickup 2 to a start address of the first compressed information piece T1. Accordingly, the pickup 2 starts the reading of the compressed information from the start address of the first compressed information piece T1. This compressed information is sent through the RF amplifier 3 and the digital signal processing portion 4 to the memory controller 6. Then, the system controller 15, while sequentially recognizing the address data to be sent to the memory controller 6 together with the compressed information, controls the transfer of the compressed information from the memory controller 6 to the DRAM 7.

Next, the system controller 15 determines whether or not the read position of the compressed information corresponding to the first compressed information piece reaches the predetermined position before the edge of the ending of the first compressed information piece T1 (step 3). This judgment is carried out by comparing the address data sent to the memory controller 6 together with the compressed information with the address data indicative of the predetermined position before the edge of the ending of the first compressed information piece T1.

The predetermined position before the ending of the first compressed information piece is the tb1 shown in FIG. 2. The address data indicative of the predetermined position tb1 is calculated by the system controller 15 and then stored in the internal memory, when the reproduction of the MD 101 is started. Moreover, the address data indicative of the positions ta2, ta3, . . . , taN in FIG. 2 and the address data indicative of the positions tb2, tb3, . . . , tbN are also calculated by the system controller 15 and then stored in the internal memory, when the reproduction of the MD 101 is started. Incidentally, the address data indicative of the positions ta2, ta3, . . . , taN and the address data indicative of the positions tb2, tb3, . . . , tbN can be calculated on the basis of the start address and the end address of each compressed information piece.

At step 3, if the read position does not reach the predetermined position tb1, the process returns back to step 2. Then, the reading of the first compressed information and the transfer of the compressed information to the DRAM 7 are continued.

On the other hand, if the read position reaches the predetermined position tb1, the system controller 15 suspends the reading of the compressed information from the MD 101, and then controls the memory controller 6 so as to suspend the transfer of the compressed information to the DRAM 7.

At this stage, the compressed information contained within the first compressed information piece T1, except for the compressed information located between the tb1 and the edge of the ending of the first compressed information piece T1, is stored into the DRAM 7.

Next, the system controller 15 determines whether or not there is a compressed information piece to be next read (step 4). If there is not the compressed information piece to be next read, the process proceeds to step 8. At step 8, the system controller 15 ends the transfer of the compressed information to the DRAM 7.

On the other hand, if there is the compressed information piece to be next read, namely, if there is the second compressed information T2, the system controller 15 moves the read position of the pickup 2 to the predetermined position ta2 located after the edge of the beginning of the second compressed information piece T2 (step 5).

Next, the system controller 15, after determining that the read position of the pickup 2 is moved to the predetermined position ta2 (step 6), increases a value of the counter N by 1 (step 7). Successively, the system controller 15 starts the reading of the compressed information corresponding to the second compressed information piece T2 from the position ta2, and sequentially transfers the compressed information to the DRAM 7 (step 2). At this time, this compressed information is stored immediately after the compressed information which has been already stored in the DRAM 7. That is to say, the compressed information and other additional information existing while the read position of the pickup is moved from the position tb1 to the position ta2 are not stored in the DRAM 7. As a result, as shown in FIG. 2, the compressed information corresponding to the first compressed information pieces T1 and the compressed information corresponding to the second compressed pieces T2 are linked with each other in the DRAM 7.

After that, the above-mentioned processes are repeated until it is determined at step 4 that there is not the compressed information piece to be next read. As a result, the portion in which the compressed information at the start portion and the end portion of the compressed information piece is removed from the compressed information corresponding to each specified compressed information piece is continuously stored in the DRAM 7.

According to such a transfer control process, the silent portion, the fade-in portion and the fade-out portion between the compressed information pieces can be removed, and further the respective compressed information pieces can be continuously arrayed in the DRAM 7. In other words, the compressed information pieces can be linked. Hence, even if there is the silent portion, the fade-in portion and the fade-out portion between the compressed information pieces recorded in the MD 101, the musical sound corresponding to the plurality of compressed information pieces can be actually continuously reproduced.

As a result, for example, even if the MD player 100 is mounted in the car and then the MD 101 is reproduced in the running car, the driver can successively enjoy the music without feeling the blank between the respective songs.

Second Embodiment

Figure 4:
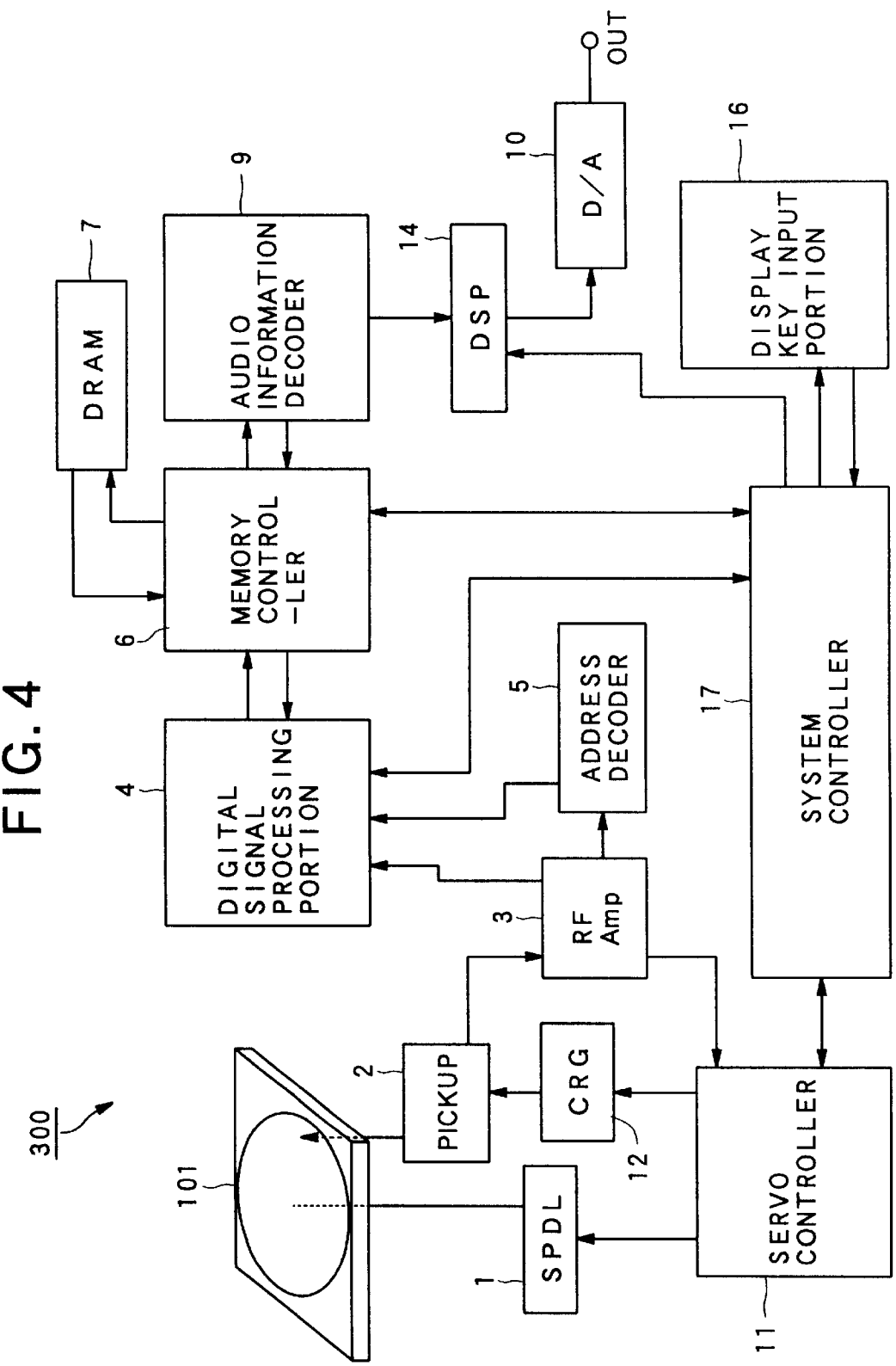
FIG. 4 is a block diagram showing an MD player according to a second embodiment of the present invention.

A second embodiment of the present invention will be described below. FIG. 4 shows a configuration of an MD player 300 of this embodiment. In FIG. 4, the same constructional elements as those in FIG. 1 carry the same reference number, and the explanation thereof are omitted.

As shown in FIG. 4, the MD player 300 has a DSP (Digital Signal Processor) 14 in addition to the above-mentioned configuration of the MD player 100. Moreover, a system controller 17 has the functions substantially similar to those of the above-mentioned system controller 15, and further has a function of carrying out a sound volume control process described later.

When the above-mentioned linking function is executed, the compressed information from which the silent portion, the fade-in portion or the fade-out portion between the compressed information pieces is removed is stored in the DRAM 7. Thus, if the compressed information pieces are songs, there may be a case that a connection between the songs is unnatural. In the MD player 300 according to this embodiment, a sound volume between the songs is controlled such that the connection between the songs is not unnatural and further a user does not feel that a blank between the songs is long. Concretely, a sound volume at the ending of the song is gradually dropped, and further a sound volume at the beginning of the next song is gradually raised. This sound volume control is performed to the extent that the user does not feel that the blank between the songs is long.

This sound volume control is achieved by the DSP 14. The DSP 14 functions as a digital attenuator for controlling a sound volume for digital audio data. Actually, the DSP 14, when reproducing the compressed information piece by using the linking function, controls the sound volume of a digital audio outputted by the audio information decoder 9, under the control of the system controller 17. The system controller 17 controls the DSP 14, and then specifies a timing when the sound volume of the digital audio is controlled, and further determines a drop width and a raise width of the sound volume.

Figure 5:
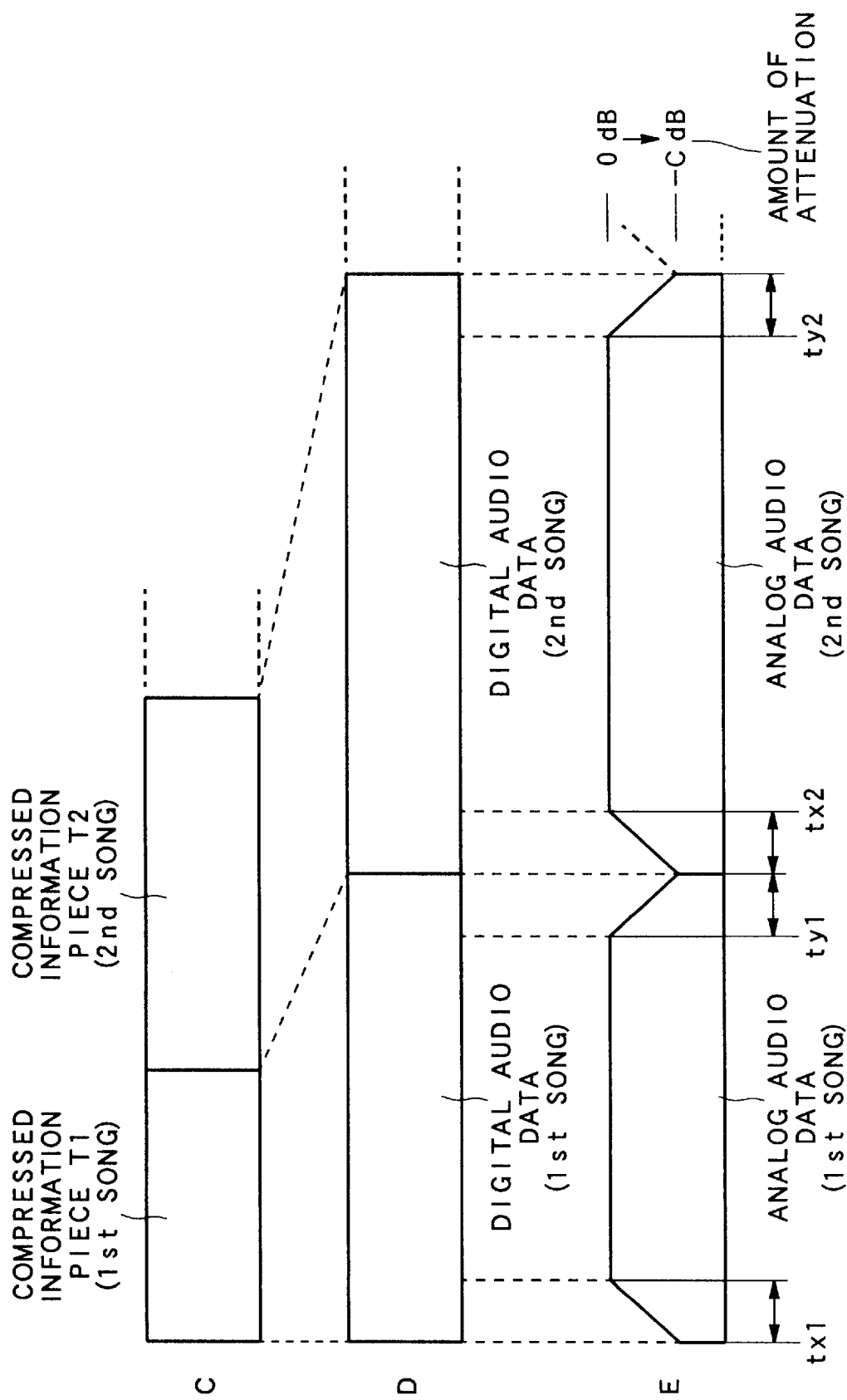
FIG. 5 is a diagram showing compressed information pieces.

FIG. 5 is a schematic view showing the sound volume control for the digital audio data corresponding to the compressed information stored in the DRAM 7. (C) in FIG. 5 shows the compressed information stored in the DRAM 7 by using the linking function. (C) in FIG. 5 is equal to (B) in FIG. 2. (D) in FIG. 5 shows the digital audio data prepared by the fact that the compressed information stored in the DRAM 7 is expanded by the audio information decoder 9. (E) in FIG. 5 shows the analog audio data prepared by the fact that the digital audio data shown in (D) is converted by the D/A converter 10. In the portions corresponding to the lead and the ending of the compressed information piece among the analog audio data shown in (E) of FIG. 5, the sound volumes thereof have been controlled by the DSP 14.

As can be seen from FIG. 5, in the digital audio data corresponding to the first compressed information piece T1, the sound volume (attenuator amount) is gradually raised from −C dB to 0 dB, between the beginning of this compressed information piece T1 and the predetermined position tx1. Moreover, in the digital audio data corresponding to the first compressed information piece T1, the sound volume (attenuator amount) is gradually dropped from 0 dB to −C dB, between the predetermined position ty1 and the ending of this compressed information piece T1. Similarly, in the digital audio data corresponding to the second compressed information piece T2, the sound volume (attenuator amount) is gradually raised from −C dB to 0 dB, between the beginning of this compressed information piece T2 and the predetermined position tx2. Moreover, in the digital audio data corresponding to the second compressed information piece T2, the sound volume (attenuator amount) is gradually dropped from 0 dB to −C dB, between the predetermined position ty2 and the ending of this compressed information piece T2.

Here, "C" is set to an attenuation amount, for example, in such a way that if the MD player 300 is mounted in a car and then the MD 101 is reproduced at a usual sound volume during running, the connection between the reproduction sounds in the boundary between the compressed information pieces is not unnatural and further the driver can recognize these reproduction sounds.

Accordingly, if the compressed information pieces are songs, when a song is ended, a reproduction sound thereof is faded out, and continuously a reproduction sound of the next song is faded in. However, between these songs, the reproduction sound only decreases to the level corresponding to the above-mentioned predetermined attenuation amount C. Thus, the user does not feel the blank between the songs. Moreover, accordingly, the songs can be naturally linked, which can prevent the music from being suddenly changed between the songs.

Figure 6:
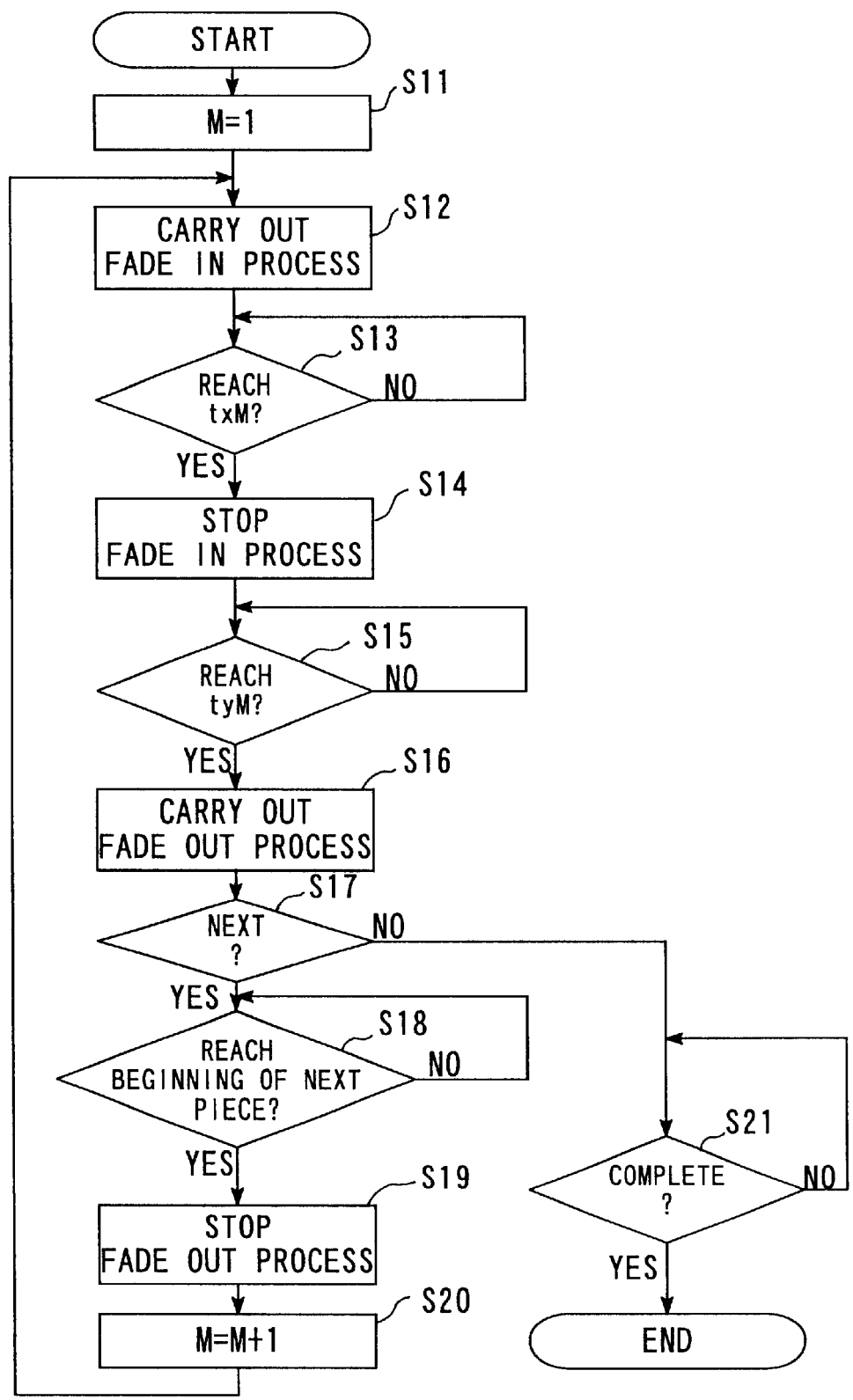
FIG. 6 is a diagram showing a volume control process carried out by the MD player of the second embodiment of the present invention.

FIG. 6 shows the sound volume control process executed by the DSP 14 and the system controller 17, after the execution of the linking function, in the MD player 300.

In FIG. 6, at first, the system controller 17 assigns a value of 1 to a counter M to specify the number of the compressed information piece (step 11). Accordingly, the compressed information corresponding to the first compressed information piece T1 stored in the DRAM 7 by the linking function is read out, and then transferred to the audio information decoder 9. This compressed information is expanded by the audio information decoder 9, and then sent to the DSP 14 as the digital audio data. The system controller 17 controls the DSP 14 to then carry out the fade-in process on this digital audio data (step 12).

While this fade-in process is executed, the system controller 17 detects an address corresponding to the compressed information read out from the DRAM 7, and then monitors the progress of the process.

Next, the system controller 17 determines, on the basis of the address corresponding to the compressed information read out from the DRAM 7, whether or not the digital audio data sent to the DSP 14 reaches a predetermined position tx1 shown in FIG. 5 (step 13). If the digital audio data does not reach the position tx1, the system controller 17 continues the fade-in process. On the other hand, if the digital audio data reaches the position tx1, the system controller 17 controls the DSP 14 to thereby stop the fade-in process (step 14).

At this stage, the fade-in process is performed on the digital audio data corresponding to the beginning of the first compressed information piece T1, and this is sent to the D/A converter 10.

Next, the system controller 17 determines, on the basis of the address corresponding to the compressed information read out from the DRAM 7, whether or not the digital audio data sent to the DSP 14 reaches a predetermined position ty1 in FIG. 5 (step 15). If the digital audio data does not reach the position ty1, the system controller 17 maintains the attenuation amount of the DSP 14 at 0 dB. Accordingly, the digital audio data is not attenuated. Then, it is passed through the DSP 14, and further sent to the D/A converter 10. On the other hand, if the digital audio data reaches the position ty1, the system controller 17 controls the DSP 14 to thereby carry out the fade-out process on the digital audio data (step 16).

Next, the system controller 17 determines whether or not the next compressed information piece (the second compressed information piece T2) is stored in the DRAM 7 (step 17). If the second compressed information piece T2 is stored in the DRAM 7, the system controller 17 determines, on the basis of the address corresponding to the compressed information read out from the DRAM 7, whether the digital audio data sent to the DSP 14 reaches a position corresponding to the beginning of the second compressed information piece T2 (step 18). If the digital audio data does not reach the position corresponding to the beginning of the second compressed information piece T2, the system controller 17 continues the fade-out process. On the other hand, if the digital audio data reaches the position corresponding to the beginning of the second compressed information piece T2, the system controller 17 controls the DSP 14 to thereby stop the fade-out process (step 19).

At this stage, the fade-out process is performed on the digital audio data corresponding to the ending of the first compressed information piece T1, and this is sent to the D/A converter 10.

Next, the system controller 17 increases a value of the counter M by 1 (step 21), and then repeats the similar processes. Accordingly, the fade-in process and the fade-out process are performed on the digital audio data corresponding to the second compressed information piece T2. If there is a third compressed information piece, the similar processes are also repeated.

On the other hand, if the next compressed information piece T2 is not stored in the DRAM 7 at the step 17, it is determined on the basis of the address corresponding to the compressed information read out from the DRAM 7 whether or not the digital audio data corresponding to the first compressed information piece T1 has been sent to the DSP 14 (step 21). If the digital audio data has not been sent, the system controller 17 continues the fade-out process. On the other hand, if the supply of the digital audio data is ended, the system controller 17 stops the fade-out process. Accordingly, the sound volume control process is ended.

The fade-in process executed at the steps 12 to 14 is a digital process of gradually raising the attenuation amount of the reproduction sound of the digital audio data from −C dB to 0 dB, between the beginning of the compressed information piece and the predetermined position (for example, tx1), as shown in FIG. 5. The fade-out process executed at the steps 16 to 19 is a digital process of gradually dropping the sound volume (attenuation amount) from 0 dB to −C dB, between the predetermined position (for example, ty1) and the ending of the compressed information piece.

As a result of the above-mentioned sound volume control process, the reproduction sound of the digital audio data corresponding to the beginning of each compressed information piece is gradually raised from −C dB to 0 dB, and the reproduction sound of the digital audio data corresponding to the ending of each compressed information piece is gradually dropped from 0 dB to −C dB.

The combination of the linking function and this sound volume control process enables a plurality of compressed information pieces to be actually linked, by removing the silent portion, the fade-in portion and the fade-out portion between the compressed information pieces, from the compressed information, and further enables the sound volumes of the reproduction sounds at the ending of the compressed information piece and the beginning of the next compressed information piece to be controlled within the range in which the user can recognize the reproduction sound.

Accordingly, the analog audio signal outputted from the output terminal of the D/A converter 10 is never interrupted even between the compressed information pieces. Moreover, the reproduction sounds are naturally connected between the compressed information pieces. For example, the reproduction sound is never suddenly changed between the songs. Thus, even if the MD player 300 is mounted in the car and then the MD is reproduced in the running car, the driver does not feel the blank and the unnatural connection between the songs. Hence, the driver can hear the plurality of songs continuously and smoothly.

Incidentally, both the fade-in portion and the fade-out portion are removed in the linking function. However, the present invention is not limited to it. Thus, any one of the fade-in portion and the fade-out portion may be removed.

Moreover, in the sound volume control process, the position of the digital audio data sent to the DSP 14 (for example, tx1, ty1) is determined on the basis of the address corresponding to the compressed information read out from the DRAM 7. At this time, there is actually a temporal difference resulting from a time necessary for the expanding process in the audio information decoder 9, between the timing when the compressed information is read out from the DRAM 7 and the timing when the digital audio data corresponding to it is sent to the DSP 14. Thus, the system controller 17 considers the temporal difference between both the timings to thereby determine the position of the digital audio data to be sent to the DSP 14. Accordingly, the accuracy of the sound volume control process can be improved.

In the sound volume control process, it is possible to properly set the raise width and the drop width of the sound volume of the digital audio data corresponding to the lead and the ending of the compressed information piece. The attenuation amount C may be fixed or may be properly adjusted by the user. It is not necessary that the change of the sound volume of the digital audio data corresponding to the beginning of the compressed information piece is a linear change proportional to the time. It is allowable to set a change having a preferable curve (sound volume change performance) depending on a user selection or a song.

Moreover, in the sound volume control process, the fade-in process is performed on the digital audio data corresponding to the beginning of the compressed information piece, and the fade-out process is performed on the digital audio data corresponding to the ending of the compressed information piece. However, the present invention is not limited to it. In the sound volume control, only the fade-out process may be performed on the digital audio data corresponding to the ending of the compressed information piece.

In the above-mentioned embodiments, the MD is exemplified as the information record medium, and the MD player is exemplified as the information reproducing apparatus. However, the present invention is not limited to it. For example, the present invention can be applied to a CD player, a DVD player and the like which reproduce the information record medium, such as CD, DVD and the like. Moreover, the present invention can be applied to another reproducing apparatus if it is a reproducing apparatus for reproducing a record medium on which a plurality of information pieces can be recorded.

In the above-mentioned embodiments, the case is exemplified in which the information is compressed and recorded on the record medium. However, the present invention is not limited to the case. The present invention can be applied to a reproducing apparatus for reproducing a record medium on which non-compressed information is recorded. This case does not require an information expanding circuit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-12109 filed on Jan. 6, 1998 including the specification, claims, drawings and summary is incorporated herein by reference in its entirety.

What is claimed is:

1. An apparatus for reproducing a plurality of information pieces recorded on a recording medium, comprising:
   a reading device for reading the information pieces from the recording medium in accordance with a predetermined reproduction order;
   a linking device for linking the information pieces read by the reading device with each other, by removing either or both of a beginning and an ending of each of the information pieces without deleting the beginning and ending from the recording medium; and
   a converting device for converting the information pieces linked by the linking device into a reproduction signal to be supplied to an output device.

2. The apparatus according to claim 1, wherein the linking device comprises:
   a read position detecting device for detecting a read position of the reading device on the recording medium; and
   a read position control device for controlling a movement of the read position of the reading device on the recording medium,
   the read position detecting device detects a first read position corresponding to a first position of each of the information pieces, which is located in a vicinity of an ending of each of the information pieces, and
   the read position control device controls the movement of the read position such that the read position jumps from the first read position to a second read position corresponding to a second position of each of the information pieces, which is located in a vicinity of a beginning of each of the information pieces.

3. The apparatus according to claim 2, wherein the linking device comprises a storing device for storing the information pieces read by the reading device such that the first position of each of the information pieces is linked with the second position of each of the information pieces in accordance with the reproduction order.

4. The apparatus according to claim 2, wherein, with respect to each of the information pieces, the first position is located within the information piece and located a predetermined distance away from an edge of the ending of this information piece.

5. The apparatus according to claim 2, wherein the first position is located at an edge of the ending of each of the information pieces.

6. The apparatus according to claim 2, wherein, with respect to each of the information pieces, the second position is located within the information piece and located a predetermined distance away from an edge of the beginning of this information piece.

7. The apparatus according to claim 2, wherein the second position is located at an edge of the beginning of each of the information pieces.

8. The apparatus according to claim 2, wherein each of the information pieces includes audio information, and the reproduction signal is an audio signal.

9. The apparatus according to claim 8, further comprising:
   a volume control device for controlling a volume of the audio signal corresponding to the audio information included in each of the information pieces,
   wherein, with respect to each of the information pieces, the volume control device controls the volume such that the volume gradually decreases from a third position of the information piece, which is located a predetermined distance away from the first position of this information piece, to the first position of this information piece.

10. The apparatus according to claim 8, further comprising:
    a volume control device for controlling a volume of the audio signal corresponding to the audio information included in each of the information pieces,
    wherein, with respect to each of the information pieces, the volume control device controls the volume such that the volume gradually increases from the second position of the information piece to a fourth position of this information piece, which is located a predetermined distance away from the second position of this information piece.

11. An information reproducing apparatus, comprising:
    a reading device for reading a sequence of two or more songs from a recording medium;
    a controller operable in a linking mode for linking at least first and second songs in the sequence by removing either or both of the ending of the first song and the beginning of the second song without deleting the ending of the first song and the beginning of the second song from the recording medium, wherein the second song follows the first song in the sequence; and
    a terminal for outputting reproduction signals corresponding to the linked first and second songs.

12. The apparatus according to claim 11, wherein the recording medium comprises an optical storage medium.

13. The apparatus according to claim 11, wherein the sequence for reading songs is determined by data stored on the recording medium.

14. The apparatus according to claim 11, further comprising:
    a user-operable input device,
    wherein the sequence for reading songs is determined in accordance with inputs to the input device.

15. The apparatus according to claim 11, wherein the beginning of the second song comprises one or both of a silent portion and a fade-in portion.

16. The apparatus according to claim 11, wherein the ending of the first song comprises a fade-out portion.

17. The apparatus according to claim 11, further comprising:

a memory for storing the linked songs.

18. The apparatus according to claim 11, further comprising:

a digital signal processor for selectively increasing and decreasing the sound volume in the vicinity of the transition from the first to the second song.

19. The apparatus according to claim 11, wherein the controller is also operable in a non-linking mode.

* * * * *